United States Patent [19]

Arikawa

[11] 3,857,613
[45] Dec. 31, 1974

[54] ELECTRONIC CONTROLLER FOR USE IN ANTI-SKID SYSTEM FOR VEHICLES

[75] Inventor: Tetsuro Arikawa, Yokosuka, Japan

[73] Assignee: Nippon Air Brake Company Ltd., Kobe, Japan

[22] Filed: June 4, 1973

[21] Appl. No.: 366,456

[30] Foreign Application Priority Data
Sept. 29, 1972 Japan.............................. 47-95730

[52] U.S. Cl.............................. 303/21 BE, 303/20
[51] Int. Cl.............................................. B60t 8/08
[58] Field of Search ..... 180/82 R; 188/181; 303/20, 303/21; 317/5; 324/161–162; 340/52 R, 53, 262–263, 62; 307/10 R

[56] References Cited
UNITED STATES PATENTS

| | | | |
|---|---|---|---|
| 3,499,689 | 3/1970 | Carp et al............................ | 303/21 P |
| 3,525,553 | 8/1970 | Carp et al............................ | 303/21 P |
| 3,556,610 | 1/1971 | Leiber................................ | 303/21 P |
| 3,578,819 | 5/1971 | Atkins................................ | 303/21 BE |
| 3,604,762 | 9/1971 | Ando et al.......................... | 303/21 BE |
| 3,671,083 | 6/1972 | Matsumura........................ | 303/21 BE |
| 3,754,797 | 8/1973 | Rodi et al.......................... | 303/21 BE |
| 3,782,783 | 1/1974 | Jones................................. | 303/21 P |

Primary Examiner—Trygve M. Blix
Assistant Examiner—Stephen G. Kunin
Attorney, Agent, or Firm—Bosworth, Sessions & McCoy

[57] ABSTRACT

A controller for use in anti-skid system for vehicles comprising a converter for obtaining a wheel speed responsive voltage, a generator for generating an approximate vehicle body speed pattern when the rate of reduction of the converter output reaches a first reference setting, and a comparator for comparing the converter output with the approximate vehicle body speed pattern thereby producing a control signal. In the controller, a fine control pulse generator is provided for generating a fine control pulse signal having variable "on" and "off" durations proportional to the wheel deceleration and acceleration thereby carrying out the on-off control of the control signal in quasi-analog fashion.

2 Claims, 5 Drawing Figures

ELECTRONIC CONTROLLER FOR USE IN ANTI-SKID SYSTEM FOR VEHICLES

This invention relates to anti-skid systems for vehicles and more particularly to improvements in electronic control means (hereinafter referred to as a controller) used in an anti-skid system which controls the rotating speed of the wheels of an automotive vehicle for establishing the optimum state of frictional engagement between the wheels and the ground while preventing undesirable locking of the wheels occurring when the brake is abruptly applied to the vehicle during running on the ground offering high or medium adhesion or when the brake is applied to the vehicle during running on an unusual ground such as a snow-laden or frozen ground offering low adhesion thereby reducing the braking distance and preventing the danger of irregular gyration of the vehicle body due to locking of the wheels.

Various anti-skid systems for vehicles have been proposed heretofore and most of these prior art anti-skid systems have resorted to a braking force control method of the so-called broken line type in which the braking force is relaxed with the increase of the wheel deceleration and applied with the decrease of the wheel deceleration and these braking force relaxing and applying cycles are repeated at a frequency of the order of 1 to 5 Hz. It is known that one of the best control methods is the analog control method when economy is not taken into consideration. Thus, attempts have been made for attaining a suitable control which is as close to the analog control as possible by providing a braking force maintaining cycle in addition to the braking force relaxing and applying cycles or by varying the rate of relaxing and applying the braking force over a plurality of stages.

In an effort to make further improvements in the controller employed in the prior art anti-skid systems of the kind above described so as to attain a control which simulates the analog control, the present invention contemplates the provision of a controller which is capable of attaining a quasi-analog control by repeating the braking force relaxing and applying cycles in a broken line fashion at a higher frequency of the order of, for example, 20 Hz. Various anti-skid systems based on such quasi-analog fine control have been proposed since such control provides many advantages including capability of fine control of the braking force, smooth rotation of the wheels and comfortable sense of ride. However, none of the prior art anti-skid systems have been successful in fully realizing the above and other advantages of the quasi-analog control. These advantages can be fully realized by the controller according to the present invention in which a fine control pulse generator, which generates a pulse signal whose "on" period of time (braking force relaxing period of time) and "off" period of time (braking force applying period of time) vary in proportion to the wheel deceleration and wheel acceleration respectively, is combined with an approximate vehicle body speed responsive signal generator as disclosed in copending U.S. Pat. application Ser. No. 329,353 filed Feb. 5, 1973, so as to carry out a fine quasi-analog control of the braking force. Further, the controller according to the present invention includes a vehicle body deceleration switch as disclosed in the abovementioned application so as to carry out the optimum control over all the ground conditions in the event of the application of a dangerous brake which requires the operation of the anti-skid system.

It is therefore an object of the present invention to provide a novel and improved controller for use in an anti-skid system for vehicles which carries out a quasi-analog control by repeating the braking force relaxing and applying cycles at a high frequency thereby finely and easily controlling the braking force, ensuring smooth rotation of the wheels and giving a comfortable sense of ride.

Another object of the present invention is to provide a controller in which means are provided for changing over the reference setting of an approximate vehicle body speed responsive signal generator in the controller to a suitable one of a plurality of levels in response to the result of detection of the vehicle body deceleration thereby continuously attaining the optimum control regardless of ground conditions.

A further object of the present invention is to provide a controller of simple construction which is economical and can operate effectively and reliably to ensure a safe drive at whatever ground conditions.

The above and other objects, features and advantages of the present invention will be apparent from the following detailed description of a preferred embodiment thereof taken in conjunction with the accompanying drawings, in which.

An embodiment of the present invention will now be described in detail with reference to the drawings.

Figure 1:
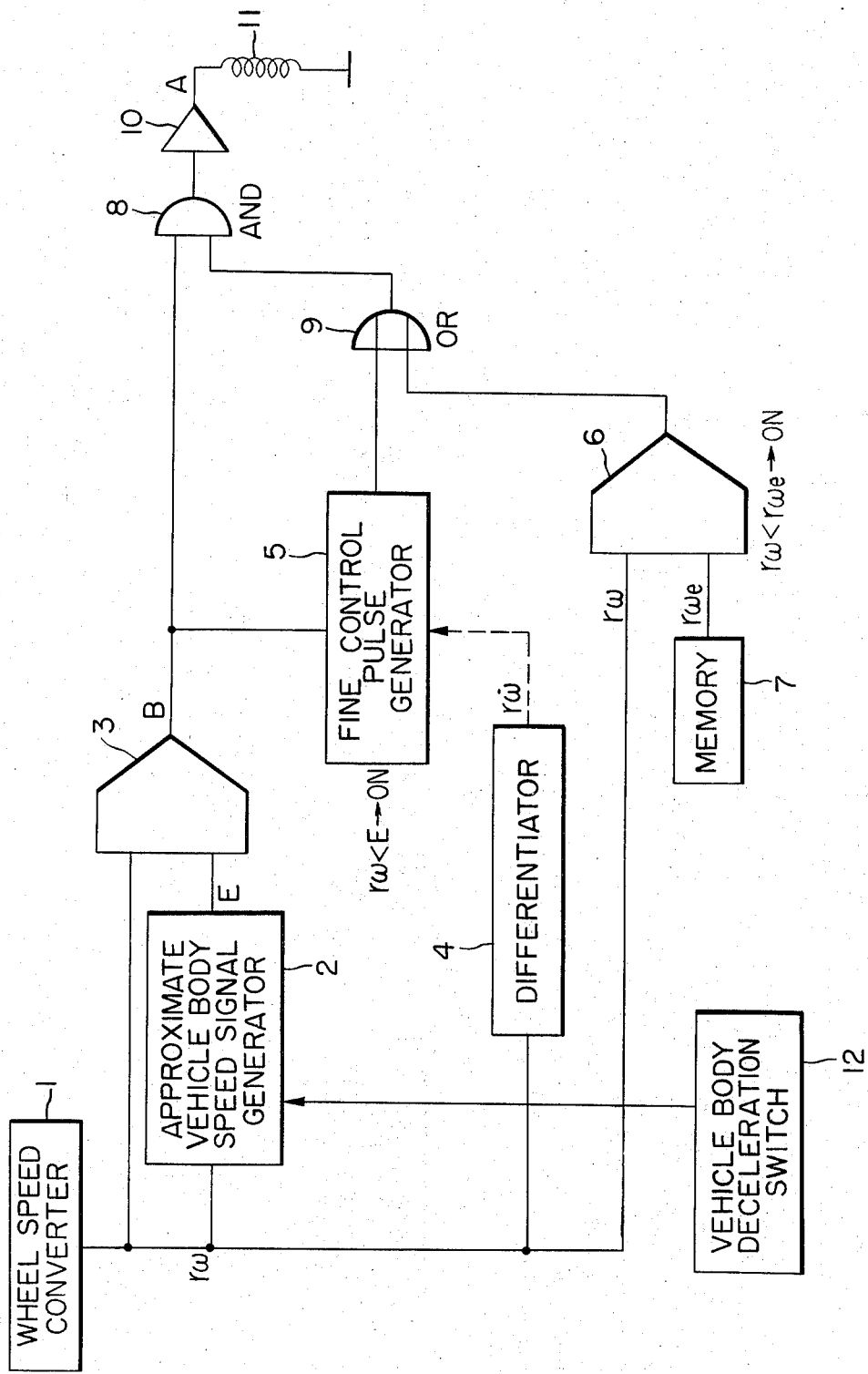
FIG. 1 is a block diagram of a controller for an anti-skid system according to the present invention.

Referring to FIG. 1, a wheel speed detector or sensor (not shown) detects or senses the wheel speed $r\omega$, where $r$ is the radius of the wheel and $\omega$ is the angular velocity of the wheel, and produces an a.c. voltage having a frequency proportional to the wheel speed $r\omega$. This a.c. voltage is applied to a converter 1 to be converted into a d.c. voltage having a level proportional to the wheel speed $r\omega$. Thus, the output of the converter 1 is representative of the wheel speed $r\omega$. This output is applied to an approximate vehicle body speed signal generator 2 which is composed of a capacitor and a constant-current power supply. When the rate of reduction of the wheel speed $r\omega$, hence the rate of drop of the output of the converter 1 reaches the level of a first reference setting $-\alpha p$, the generator 2 generates a signal representative of an approximate vehicle body speed E whose deceleration $-\alpha p$ is constant. A first comparator 3 compares the input representative of the approximate vehicle body speed E with the input representative of the wheel speed $r\omega$. When the former input is equal to the latter input, no output or "0" appears from the comparator 3, while when the former input is larger than the latter input, an output or "1" appears from the comparator 3. The output of the converter 1 is also applied to a differentiator 4 which is in the form of a CR combination. The differentiator 4 differentiates the input representative of the wheel speed $r\omega$ and generates a signal representative of a wheel acceleration $r\omega$ when the wheel speed $r\omega$ is being increased. This signal is representative of a wheel deceleration $-r\dot\omega$ when the wheel speed is being decreased. A fine control pulse generator 5 generates a pulse signal having a predetermined frequency only when an output appears at the output terminal B of the first comparator 3. The "on" period of time and "off" period of time of this pulse signal vary in proportion to the wheel deceleration. More precisely, the "on" period of time is equal to the "off" period of time when the wheel deceleration is zero, and the former becomes longer than the latter in proportion to the wheel deceleration with the increase in the wheel deceleration, while the former becomes shorter than the latter with the increase in the wheel speed. A second comparator 6 compares the input representative of the wheel speed $r\omega$ with a second reference setting $r\omega_e$ applied from a memory 7 and generates an output or "1" when the former input is smaller than the latter input. An AND gate 8 and an OR gate 9 are provided so that, only when the output appears at the output terminal B of the first comparator 3, that is, only when the signal representative of the approximate vehicle body speed E appears from the generator 2 and the relation $r\omega<E$ holds, the quasi-analog fine control can be applied to the braking force, while when the wheel speed $r\omega$ is low and the relation $r\omega<r\omega_e$ holds, the braking force can be controlled depending solely on the appearance and disappearance of the output at the output terminal B of the first comparator 3. This second comparator 6 is provided for the following reasons: Consider, for example, the case in which the adhesion of the ground on which the vehicle is running varies abruptly from a high to a low value, or the case in which a strong braking force is applied during running of the vehicle on the ground offering a very low adhesion or the case in which the speed of the vehicle is reduced to a low speed range. If the wheels of the vehicle are completely locked against rotation due to an abrupt reduction of the wheel speed in such a case, both the wheel speed $r\omega$ and the wheel deceleration $-r\dot\omega$ will be reduced to zero and the "on" period of time and "off" period of time of the pulse signal generated by the fine control pulse generator 5 will become equal to each other. Thus, the brake fluid pressure may not be relaxed substantially thereafter and the wheels may not be released from the locked condition. The second comparator 6 is priovided for ensuring quick relaxation of the brake fluid pressure thereby eliminating such danger.

The output of the AND gate 8 is amplified by a power amplifier 10 and energizes a solenoid 11 in a brake fluid pressure control means for relaxing the brake fluid pressure.

A vehicle body deceleration switch 12 acts to change over the value of the first reference setting $-\alpha p$ in the approximate vehicle body speed signal generator 2 to a suitable one of a plurality of levels depending on the vehicle body deceleration $-\dot V$ in such a manner that the value of the first reference setting $-\alpha p$ is increased with the increase in the vehicle body deceleration $-\dot V$. Actually, the vehicle body deceleration switch 12 has such a construction that one of a plurality of conductive rods is always immersed in a conductive fluid such as mercury contained in a U-tube and the remaining conductive rods are fixed at suitable different levels higher than the surface level of the conductive fluid. This U-tube is secured in the advancing direction of the vehicle so that these conductive rods act as a switch when the surface level of the conductive fluid inclines with respect to the horizontal depending on the deceleration of the vehicle. (This switch is illustrated in FIG. 4 as one having a sectoral movable contact opposite to a plurality of stationary contacts.)

Figure 2:
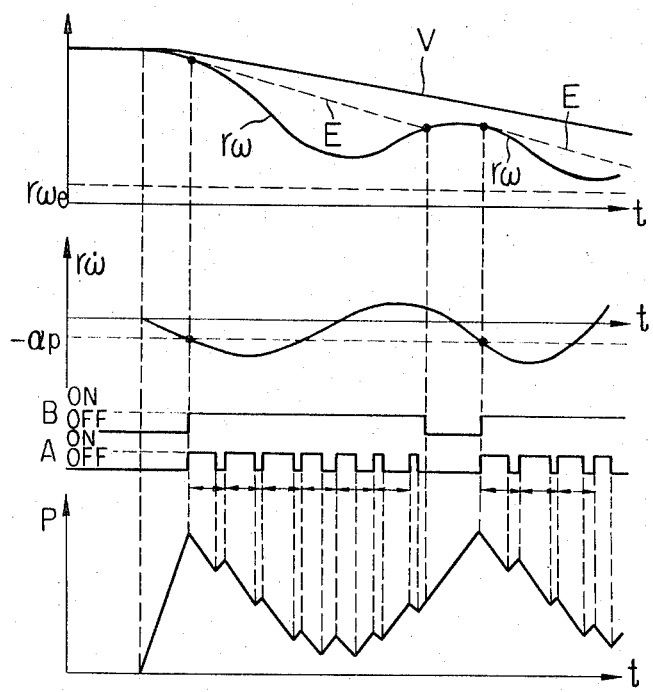
FIG. 2 is a graphic illustration of the operation of the anti-skid system.

The operation of the system shown in FIG. 1 will be described in detail with reference to FIG. 2. In response to the application of the brake in a condition which will cause the operation of the anti-skid system, the brake fluid pressure P is increased, and therefore, the braking force is increased to reduce both the vehicle body speed (approximately represented by the line V) and the wheel speed $r\omega$. The reduction of the wheel speed $r\omega$ may continue until finally the wheels are locked against rotation if the anti-skid system were not provided, since in such a case the braking force overcomes the adhesion offered by the ground. When the rate of reduction of the wheel speed $r\omega$ or the rate of reduction of the output of the converter 1 reaches the level of the first reference setting $-\alpha p$, the approximate vehicle body speed signal generator 2 generates an output representative of the approximate vehicle body speed E to apply this output to the first comparator 3, and an output or "1" appears at the output terminal B of the first comparator 3. The fine control pulse generator 5 generates a pulse signal having a predetermined frequency in which the "on" or relaxing period of time is equal to the "off" or applying period of time when the wheel deceleration is zero and the former is increased relative to the latter in proportion to the wheel deceleration. This pulse signal is used for the quasi-analog fine control of the brake fluid pressure. More precisely, due to the fact that the wheel deceleration is large in the initial stage of the brake fluid pressure control, the relaxing period of time is longer than the applying period of time thereby gradually decreasing the wheel deceleration. When finally the vehicle is accelerated, the relaxing period of time is rendered shorter than the applying period of time so as to prevent the wheel speed from being excessively increased. As the wheel speed $r\omega$ is gradually increased until finally it becomes equal to the approximate vehicle body speed E, the output from the approximate vehicle body speed signal generator 2 disappears. At the same time, the quasi-analog fine control on the brake fluid pressure is terminated and the braking force is increased without such control. In response to the reduction of the wheel speed $r\omega$ again, the above operation is repeated to control the braking force. When the wheel speed $r\omega$ becomes smaller than the second reference setting $r\omega_e$ during such operation, the brake fluid pressure is controlled by the output appearing at the output terminal B of the first comparator 3, that is, the signal appearing from the first comparator 3 depending on the relation between the approximate vehicle body speed E and the wheel speed $r\omega$. This manner of quasi-analog fine control for the relaxation and application of the brake fluid pressure P is repeated to control the brake fluid pressure P so as to provide the optimum slip ratio.

Figure 3:
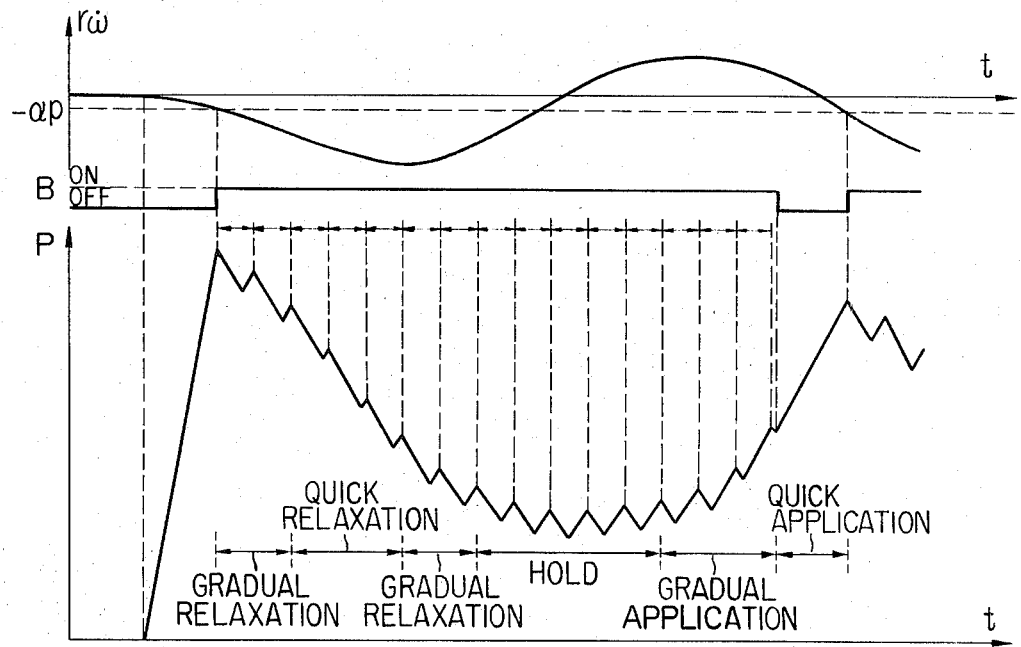
FIG. 3 is an enlarged representation of part of FIG. 2.

Referring next to FIG. 3, this quasi-analog fine control will be described in more detail. In response to the application of the brake in a condition which will cause the operation of the anti-skid system, the wheel deceleration $-r\dot\omega$ is increased and the quasi-analog fine fluid pressure control is carried out in the manner above described when the wheel deceleration $-r\dot\omega$ reaches the level of the first reference setting $-\alpha p$. According to an ideal control in prior art anti-skid systems, the brake fluid pressure P is abruptly relaxed from a gradual relaxing state with the increase in the wheel deceleration $-r\dot\omega$, and the brake fluid pressure P is gradually relaxed, maintained, gradually applied and abruptly applied when the acceleration is finally attained with the decrease of the wheel deceleration $-r\dot\omega$. This manner of broken line control is repeated to control the brake fluid pressure P. In contrast, the quasi-analog fine fluid pressure control according to the present invention is such that the "on" period of time of the fine control pulse signal having the predetermined frequency is increased relative to the "off" period of time for gradually relaxing the brake fluid pressure P after the wheel deceleration $-r\dot\omega$ has reached the level of the first reference setting $-\alpha p$. With a further increase in the wheel deceleration $-r\dot\omega$, the "on" period of time of the pulse signal is further increased to abruptly relax the brake fluid pressure P. As the wheel deceleration $-r\dot\omega$ is decreased toward zero, the "on" period of time of the pulse signal becomes substantially equal to the "off" period of time thereby gradually relaxing the brake fluid pressure P and then maintaining the relaxed brake fluid pressure P. As the wheel acceleration $r\dot\omega$ starts to increase, the "off" period of time of the pulse signal is increased relative to the "on" period of time thereby gradually applying the brake fluid pressure P, and with a further increase in the wheel acceleration $r\dot\omega$, the fine control is ceased temporarily for abruptly applying the brake fluid pressure P. The gradual relaxation, abrupt relaxation, gradual relaxation, maintenance and gradual application of the brake fluid pressure P in the manner above described are repeated for the quasi-analog fine control of the braking force.

Figure 4:
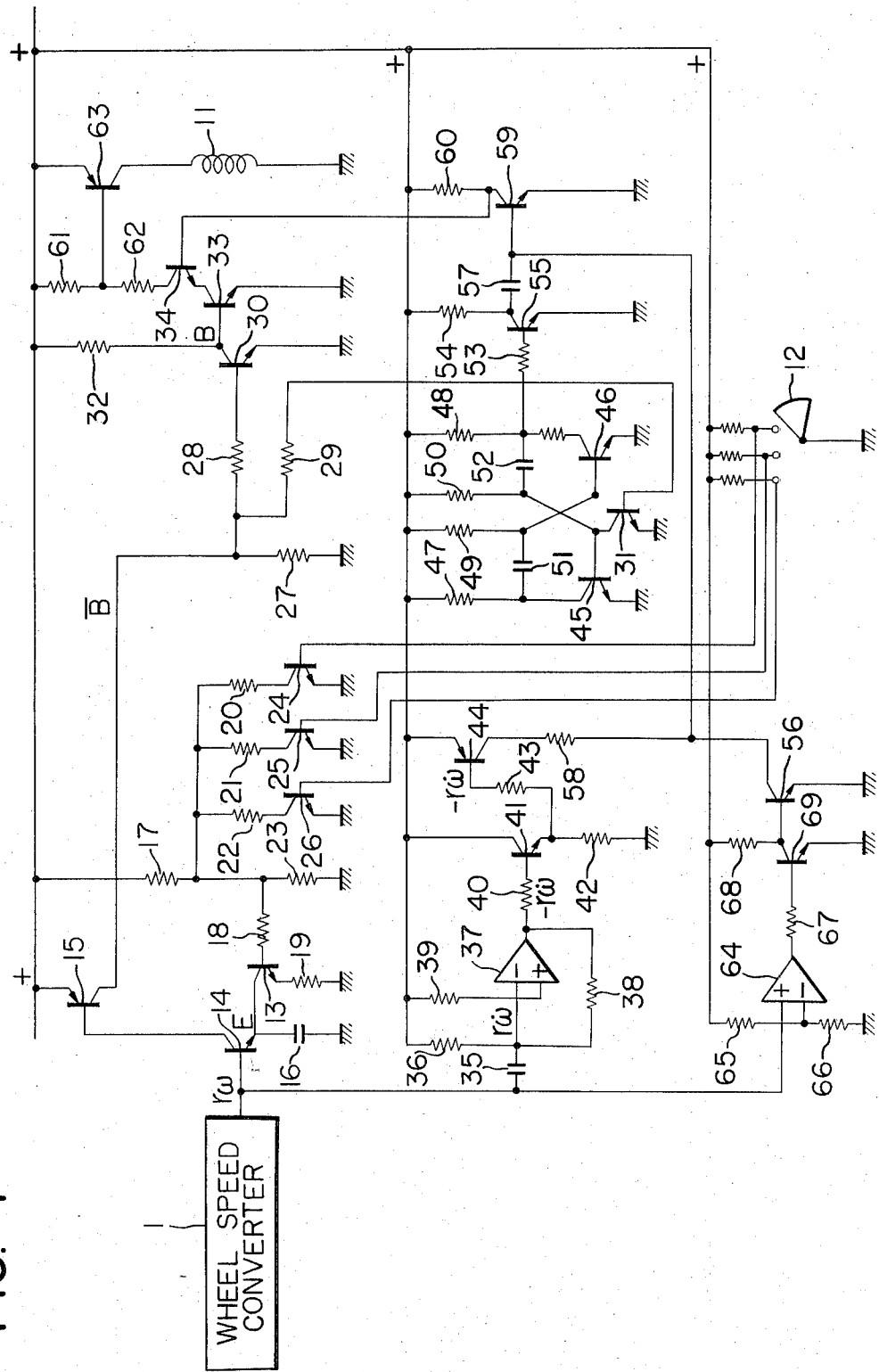
FIG. 4 is an electrical circuit diagram of the controller shown in FIG. 1.

FIG. 4 is a circuit diagram of the controller used in the system according to the present invention. Referring to FIG. 4, the converter 1, which is shown in FIG. 1, generates an output representative of the wheel speed $r\omega$. This output is applied to the base of a transistor 14. Since, in the steady running condition, a constant current flows through the collector of a transistor 13 for the reason described later, a corresponding current flows through the emitter and base of a transistor 15. Therefore, a capacitor 16 is charged and the voltage thereacross, hence the emitter potential of the transistor 14 is substantially equal to the base potential of the transistor 14, hence the voltage representative of the wheel speed $r\omega$. The collector current of the transistor 13 is constant due to the fact that the base potential thereof is maintained constant by resistors 17 to 23 and internal resistances of transistors 24, 25 and 26. The transistors 24, 25 and 26 conduct and are cut off depending on the operation of the vehicle body deceleration switch 12 (FIG. 1) thereby changing over the value of this constant current. This constant current represents the first reference setting $-\alpha p$. In FIG. 4, the vehicle body deceleration switch 12 is schematically illustrated as having a sectoral movable contact and a plurality of stationary contacts and the sectoral movable contact is rotated counter-clockwise in proportion to the increase in the vehicle body deceleration $-\dot V$. Although three stationary contacts are shown in FIG. 4, two, four or any other suitable number of such contacts may be provided. With the increase in the vehicle body deceleration $-\dot V$, the resistors 20, 21 and 22 connected in parallel with the resistor 23 are cut off by the respective transistors 24, 25 and 26 so that the base current of the transistor 13 is increased stepwise and the constant collector current thereof, hence the first reference setting $-\alpha p$ is changed over to a larger value. Although the first reference setting $-\alpha p$ is changed over to one of four different values in this embodiment, this number may be suitably varied by varying the number of the transistor-resistor combinations.

When now the wheel speed $r\omega$ is reduced in the steady running condition of the vehicle as a result of the application of the brake giving rise to the operation of the anti-skid system, the potential of the capacitor 16, hence the emitter potential of the transistor 14 is also reduced. With a further reduction in the wheel speed $r\omega$, the base potential of the transistor 14 becomes lower than the emitter potential thereof and the transistor 14 is cut off due to the fact that a constant current can only flow through the transistor 13 as above described. Thus, the constant collector current of the transistor 13 is supplied entirely from the capacitor 16. The capacitor 16 discharges with a constant current and its potential is reduced at a constant rate. This potential of the capacitor 16, hence the emitter potential of the transistor 14 represents the approximate vehicle body speed E. With the reduction of the wheel speed $r\omega$, the transistor 15 is cut off and no current is supplied to resistors 27, 28 and 29 thereby cutting off transistors 30 and 31. Current is supplied through a resistor 32 to the base of a transistor 33 constituting an AND circuit together with another transistor 34, thereby providing one of the inputs to the AND circuit. This corresponds to the operation of the first comparator 3.

In the meantime, the input representative of the wheel speed $r\omega$ is also applied to a differentiation circuit consisting of a capacitor 35 and a resistor 36 to be differentiated thereby and an output representative of the wheel acceleration $r\dot\omega$ appears from the differentiation circuit. This differentiated output is invertedly amplified by an amplifying circuit consisting of an amplifier 37 and resistors 38 and 39 to provide an output which represents the wheel deceleration $-r\dot\omega$. This output is applied through a resistor 40 to a transistor 41 and a resistor 42 to be subjected to impedance conversion. The emitter voltage of the transistor 41 represents also the wheel deceleration $-r\dot\omega$. the emitter of the transistor 41 is coupled to the base of a transistor 44 through a resistor 43 so that the internal impedance between the emitter and the collector of the transistor 44 increases in proportion to the wheel deceleration $-r\dot\omega$.

Figure 5:
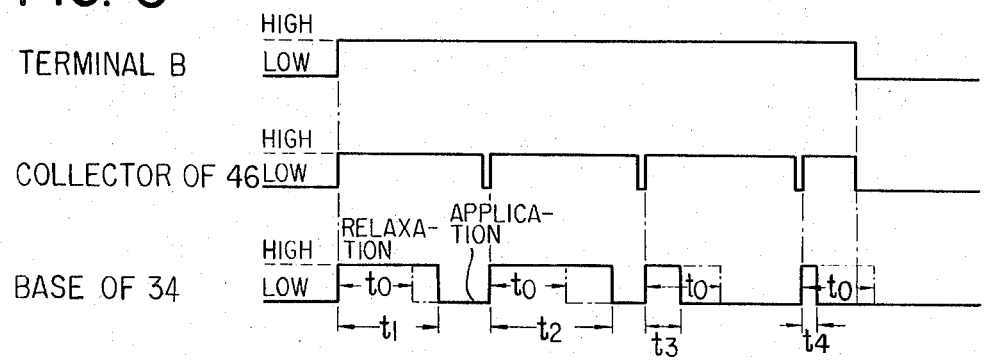
FIG. 5 shows waveforms appearing at various parts of FIG. 4.

Transistors 45, 46, resistors 47, 48, 49, 50 and capacitors 51, 52 constitute a so-called astable multivibrator from which a pulse train having a constant frequency appears as an output at the collector of the transistor 46 as shown in FIG. 5. However, any other suitable oscillator may be employed in lieu of such astable multivibrator provided that it can generate a pulse train having a constant frequency. Of course, this output appears only when the transistor 31 is in the cut-off state, that is, when the output representative of the approximate vehicle body speed E appears. In any other period of time, such pulse train does not appear due to the fact that the transistor 31 is conducting and the base thereof is grounded. The output of the multivibrator is invertedly amplified by a combination consisting of resistors 53, 54 and a transistor 55. The amplified output is then differentiated by a differentiation circuit consisting of a capacitor 57, a resistor 58 and variable internal resistance of the transistor 44 so that a pulse train having a low potential level (potential level for cutting off a transistor 59) substantially proportional to the internal resistance of the transistor 44 (representative of the wheel deceleration $-\dot{r\omega}$) can be applied to the base of the transistor 59. Therefore, a pulse signal which has a constant frequency and in which the "on" period of time (or duration of a high potential level) is substantially proportional to the wheel deceleration $-\dot{r\omega}$ appears at the collector of the transistor 59. The "on" period of time of this pulse signal is selected to be one half of the pulse repetition period when the wheel deceleration $-\dot{r\omega}$ is zero.

Suppose that $C_{57}$ is the capacitance of the capacitor 57, $R_{58}$ is the resistance of the resistor 58, $R_{44}$ is the internal resistance of the transistor 44, $t_1, t_2, t_3 \ldots$ are the "on" durations (durations of a high potential level) of the output of the fine control pulse generator 5, hence the pulse train appearing at the collector of the transistor 59, and $t_o$ is the "on" duration of the pulses when the wheel deceleration $-\dot{r\omega}$ is zero. Then, the following relations hold:

$t_o$ = pulse repetition period $\times$ ½

$R_{44} \, \alpha \, -\dot{r\omega}$ $t_1, t_2, t_3, \ldots \, \alpha \, C_{57} (R_{58} + R_{44})$ In FIG. 5, $t_1$, $t_2$ and $t_3$ represent the "on" durations which vary depending the relations above described. This fine control pulse signal is applied as one of the inputs to the AND circuit composed of the transistors 33 and 34. Thus, when the transistor 33 is conducting, that is, so long as the output representative of the approximate vehicle body speed E appears from the generator 2, this fine control pulse signal is amplified by a power amplifier composed of resistors 61, 62 and a transistor 63 for energizing and deenergizing the solenoid 11 in the brake fluid pressure control means thereby relaxing and applying the brake fluid pressure P according to the quasi-analog fine control pattern. Of course, the brake fluid pressure P is applied when the transistor 33 is in the cut-off state, that is, when no output representative of the approximate vehicle body speed E is generated by the generator 2 due to the fact that the solenoid 11 is not energized in such a case. Further, the solenoid 11 is not energized when the transistor 31 is conducting, that is, when no output representative of the approximate vehicle body speed E appears since, in such a case, the fine control pulse signal is not generated.

The input representative of the wheel speed $r\omega$ is also applied to a comparator 64 to be compared with the second reference setting $r\omega_e$ which is determined by the resistances of resistors 65 and 66. An output of a low potential level appears from the comparator 64 when $r\omega < r\omega_e$. This output is inverted by a combination consisting of resistors 67, 68 and a transistor 69 so that the transistor 56 conducts when $r\omega < r\omega_e$ and the transmission of the fine control pulse signal is interrupted since the base of the transistor 59 is now grounded. In such a case, due to the fact that the transistor 59 is cut off and the transistor 34 is conducting, the solenoid 11, hence the brake fluid pressure P is controlled solely by the on-off of the transistor 33, hence depending on the output of the first comparator 3. This manner of brake fluid pressure control is required for preventing an undesirable situation in which the wheels may be continuously locked against rotation in certain running conditions. Such situation occurs when, for example, the adhesion of the ground changes abruptly from a high to a low value. Similarly, such situation occurs when a strong braking force giving rise to momentary locking of the wheels is applied during running on a ground offering a very low adhesion or when the speed is reduced to a low speed range. In such a situation, the fine control pulse generator is only effective to provide zero wheel deceleration, and the intermediate condition in which the "on" duration is equal to the "off" duration may be continued to continuously maintain the brake fluid pressure at a constant value thereby maintaining the wheels in the locked state. The provision of such means for comparing the wheel speed $r\omega$ with the second reference setting $r\omega_e$ and controlling the brake fluid pressure depending on the result of comparison ensures the anti-skid effect effectively and properly even in a special situation as above described.

It will be understood from the foregoing detailed description that the present invention provides an improved anti-skid system for vehicles in which brake fluid pressure applying and relaxing instructions for the fine control of the braking force are suitably produced depending on the ground conditions and vehicle body speed so as to provide suitable anti-skid effects including elimination of undesirable skidding, reduction of the distance required for stopping the vehicle by the brake and elimination of objectionable irregular gyration of the vehicle body, thereby improving the safety and sense of ride during driving. Further, the present invention is economical and practical by virtue of the fact that any complex circuitry is not required.

What is claimed is:

1. A controller for use in an anti-skid system for vehicles comprising means for detecting the rotating speed of a wheel of the vehicle, means for converting the output of said wheel speed detecting means into a wheel speed responsive signal, means for generating an approximate vehicle body speed pattern signal when the rate of reduction of the output of said converting means reaches the level of a predetermined reference setting, means for comparing the approximate vehicle body speed pattern signal with the output of said converting means thereby generating a control signal when the wheel speed responsive signal is less than the pattern signal, means for differentiating the wheel speed responsive output of said converting means thereby producing an output representative of wheel deceleration and wheel acceleration, means for generating a constant frequency fine control pulse signal having "on" and "off" durations proportional to the output of said differentiating means, switch means responsive to vehicle body deceleration for changing over said reference setting to one of a plurality of levels depending on the variation of the conditions of the ground, and an AND gate connected to said comparing means and said fine control pulse signal generating means for combining said control signal with said fine control pulse signal thereby generating a brake fluid pressure control signal.

2. A controller for use in an anti-skid system for vehicles comprising means for detecting the rotating speed of the wheel, means for converting the output of said wheel speed detecting means into a wheel speed responsive signal, means for generating an approximate vehicle body speed pattern signal when the rate of reduction of the output of said converting means reaches the level of a first reference setting, first comparing means for comparing the approximate vehicle body speed pattern signal with the output of said converting means thereby generating a first control signal, means for differentiating the wheel speed responsive output of said converting means thereby producing an output representative of wheel deceleration and wheel acceleration, means for generating a fine control pulse signal having "on" and "off" durations proportional to the output of said differentiating means, switch means responsive to vehicle body deceleration for changing over said first reference setting to one of a plurality of levels depending on the variation of the conditions of the ground, second comparing means for comparing the wheel speed responsive output of said converting means with a second reference setting thereby generating a second control signal, an OR gate connected to said fine control pulse generating means and said second comparing means for receiving the fine control pulse signal and second control signal therefrom, an AND gate connected to said OR gate and said first comparing means for receiving the output of said OR gate and first control signal of said first comparing means, and means responsive to the output of said AND gate for controlling the brake fluid pressure.

* * * * *

UNITED STATES PATENT OFFICE
CERTIFICATE OF CORRECTION

Patent No. 3,857,613          Dated December 31, 1974

Inventor(s) Tetsuro ARIKAWA

It is certified that error appears in the above-identified patent and that said Letters Patent are hereby corrected as shown below:

In the Heading of the Patent, under "Foreign Application Priority Data", - the date should read --Sept. 26, 1972--.

In the Abstract, line 1, insert --an-- before "anti-skid".

Column 3, line 1, "$r\omega$" (first occurrence) should read --$r\dot\omega$--.

Column 6, line 46, before "emitter" change "the" to --The--.

Signed and sealed this 18th day of February 1975.

(SEAL)
Attest:

RUTH C. MASON
Attesting Officer

C. MARSHALL DANN
Commissioner of Patents
and Trademarks